(12) United States Patent
Agarwala et al.

(10) Patent No.: US 12,443,680 B2
(45) Date of Patent: Oct. 14, 2025

(54) SYSTEM AND METHOD FOR DETECTING PROXIMITY BETWEEN OBJECTS

(71) Applicant: CRON SYSTEMS PVT. LTD., New Delhi (IN)

(72) Inventors: Saurav Agarwala, New Delhi (IN); Tushar Chhabra, New Delhi (IN); Alankrit Mathur, New Delhi (IN)

(73) Assignee: CRON SYSTEMS PVT. LTD., New Delhi (IN)

( * ) Notice: Subject to any disclaimer, the term of this patent is extended or adjusted under 35 U.S.C. 154(b) by 287 days.

(21) Appl. No.: 18/093,576

(22) Filed: Jan. 5, 2023

(65) Prior Publication Data

US 2023/0153390 A1    May 18, 2023

Related U.S. Application Data

(63) Continuation of application No. PCT/IB2021/056047, filed on Jul. 6, 2021.

(30) Foreign Application Priority Data

Jul. 8, 2020 (IN) .............................. 202011029115

(51) Int. Cl.
  *G06F 18/2321* (2023.01)
  *G06F 16/29* (2019.01)
  *G06F 18/231* (2023.01)

(52) U.S. Cl.
  CPC .......... *G06F 18/2321* (2023.01); *G06F 16/29* (2019.01); *G06F 18/231* (2023.01)

(58) Field of Classification Search
  None
  See application file for complete search history.

(56) References Cited

U.S. PATENT DOCUMENTS

| | | | | |
|---|---|---|---|---|
| 9,589,045 | B2* | 3/2017 | Levitan | G06F 16/322 |
| 10,042,912 | B2* | 8/2018 | Levitan | G06F 16/35 |
| 10,288,653 | B2* | 5/2019 | Agarwal | G01R 13/00 |
| 2015/0253366 | A1* | 9/2015 | Agarwal | G01R 13/00 |
| | | | | 702/71 |
| 2015/0286703 | A1* | 10/2015 | Levitan | G06F 16/322 |
| | | | | 707/737 |
| 2015/0286707 | A1* | 10/2015 | Levitan | G06F 16/9027 |
| | | | | 707/737 |
| 2018/0293449 | A1* | 10/2018 | Sathyanarayana | G07C 5/0866 |
| 2023/0153390 | A1* | 5/2023 | Agarwala | G06F 16/29 |
| | | | | 707/737 |

OTHER PUBLICATIONS

International Search Report issued by the Indian Patent Office for International Patent Application No. PCT/IB2021/056047 mailed on Nov. 11, 2021.

* cited by examiner

*Primary Examiner* — Tahmina N Ansari
(74) *Attorney, Agent, or Firm* — Myers Wolin, LLC

(57) ABSTRACT

A method is provided for detecting proximity between objects using threshold based clustering. The method includes receiving object data of a plurality of objects in a space to be monitored, from one or more data capturing devices disposed in a space, clustering the object data into one or more clusters, based on a predetermined threshold distance, thereby reducing the search space, and processing the one or more clusters using brute force to identify the plurality of objects which lie within the predetermined threshold distance of each other, thereby identifying the plurality of objects that are at risk of collision.

9 Claims, 6 Drawing Sheets

SYSTEM AND METHOD FOR DETECTING PROXIMITY BETWEEN OBJECTS

CROSS-REFERENCE TO RELATED APPLICATIONS

This application is a continuation of International Patent Application No. PCT/IB2021/056047, filed Jul. 6, 2021, which claims priority from Indian Patent Application number 202011029115, filed Jul. 8, 2020, and these applications are incorporated herein by reference for all purposes as if fully set forth herein.

FIELD OF THE INVENTION

Embodiments of the present invention generally relate to proximity detection technologies. Particularly, present disclosure relates to a system and method for detecting proximity between objects using threshold-based clustering to identify any objects that are at risk of collision.

BACKGROUND OF THE INVENTION

Ever since the advent of artificial intelligence, machine learning and sensing technologies, a need to automate various existing systems has been created. Engineers and professionals are continuously working to increase the accuracy and efficiency of automated systems. For example: systems meant for detection, monitoring and searching of objects (including humans) in a space have been constantly improved to automatically detect, identify & monitor objects on their own. Such capabilities of an intelligent system are extremely useful in applications such as monitoring a large space such as a mall, office space, airports, parking lots etc. Further, with growing usage of 3D sensing technologies, collision avoidance systems have been developed that may automatically detect objects, monitor/track their movements and also predict their collisions and raise an alert (if required) when the objects are within a predetermined distance.

Such a system easily finds application in robotics, self-driving vehicles, public place monitoring/vigilance etc. For example: In the ongoing Covid-19 situation, social distancing norms are required to be followed at every place, and humans need to maintain a certain distance from each other to avoid contamination and spread of virus. For that, continuous monitoring of the place is required, but it is very difficult to be done manually or even using CCTVs. Presently there are no such technologies that are capable of providing collision avoidance system that is cost effective as well as can be easily and widely implemented in the above-mentioned applications.

Existing solutions available for monitoring mainly use a brute force approach. In this approach, the distance between each object in the search space is calculated continuously, and then checked if the distance is less than the defined distance. The problem is that Brute Force algorithm requires a lot of time for processing and is a very resource intensive algorithm. Brute Force algorithm involves testing every possibility rather than advanced techniques to improve efficiency and therefore, rely on sheer computing power. It is an exhaustive technique. Further, some approaches also use QuadTrees in a 2D Cartesian plane and Oct-Trees in a 3D Space to detect possible collisions. But the problem is QuadTrees are limited to only 2-Dimensional coordinates and OctTrees are limited to only 3-Dimensional systems. But the user requirements keep on changing, and therefore, the user would be compelled to use both of them, which is again not economical and sometime not feasible for a user. Furthermore, there might arise a situation where the user might want to detect the risk of collision of objects in a N dimensional space.

Hence, there exists a need for a system and method for detecting proximity between objects using threshold-based clustering to identify any objects that are at risk of collision. Such system and method should be far more efficient than prior art, in terms of processing, space usage, time and resource consumption & cost and is also independent of the dimensions of the search space.

OBJECT OF THE INVENTION

An object of the invention is to provide a system and method for detecting proximity between objects using threshold-based clustering to identify any objects that are at risk of collision.

Another object of the invention is to provide a system and method for detecting proximity between objects using threshold-based clustering that uses a minimum amount of storage and processing time to give accurate results.

Yet another object of the invention is to provide a system and method for detecting proximity between objects using threshold-based clustering that is efficient in terms of time consumption, resource consumption and cost.

Yet another object of the invention is to provide a system and method for detecting proximity between objects using threshold-based clustering that is independent of the dimensions of the search space and can be used for both 2D, 3D or any "$N^{th}$" Dimension space.

Yet another object of the invention is to share processing resources on a configurable processing unit in case the number of objects received from one or more data capturing devices disposed in a space increase by run time configuring soft logic cores for accelerating processing and providing real time output.

SUMMARY OF THE INVENTION

According to a first aspect of the present invention, there is provided a method for detecting proximity between objects using threshold-based clustering. The method comprises, but not limited to, receiving object data of a plurality of objects in a space to be monitored, from one or more data capturing devices disposed in a space; clustering the object data into one or more clusters, based on a predetermined threshold distance, thereby reducing the search space; and processing the one or more clusters using brute force to identify the plurality of objects which lie within the predetermined threshold distance of each other, thereby identifying the plurality of objects that are at risk of collision.

In accordance with an embodiment of the present invention, the one or more data capturing devices are selected from visual cameras, ultrasonic sensors and 3D sensors such as radars, LiDARs, Laser Detection and Ranging (LaDAR), Light Emitting Diode Detection and Ranging (LeDDAR) mmWave Radar, C or K Band Radar, laser scanners and Time of Flight (ToF) sensors.

In accordance with an embodiment of the present invention, the object data is in a form of 2D or 3D point clouds or data points in 2D or 3D, representing the plurality of objects.

In accordance with an embodiment of the present invention, the step of clustering is performed using Balanced Iterative Reducing and Clustering using Hierarchies (BIRCH) clustering.

In accordance with an embodiment of the present invention, the step of processing the one or more clusters using brute force comprises identifying & providing a list of data points which lie within the predetermined threshold distance of each other, and accordingly identifying the plurality of objects that are at risk of collision.

In accordance with an embodiment of the present invention, the plurality of objects are all kinds of living and non-living objects selected from a group comprising humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

According to a second aspect of the invention, there is provided a system for detecting proximity between objects using threshold-based clustering. The system comprises, but not limited to, one or more data capturing devices disposed in a space to be monitored; and a processing module connected with the one or more data capturing devices. Further, the processing module comprises a memory unit configured to store machine-readable instructions; and a processor operably connected with the memory unit, the processor obtaining the machine-readable instructions from the memory unit, and being configured by the machine-readable instructions to receive object data of a plurality of objects from the one or more data capturing devices disposed in the space; cluster the object data into one or more clusters, based on a predetermined threshold distance, thereby reducing the search space; and process the one or more clusters using brute force to identify the plurality of objects which lie within the predetermined threshold distance of each other, thereby identifying the plurality of objects that are at risk of collision.

In accordance with an embodiment of the present invention, the processing module further comprises a configurable processing unit operably connected with the memory unit and the processor, configured to accelerate the clustering of the object data into one or more clusters, based on a predetermined threshold distance to reduce the search space and processing of the one or more clusters using brute force to identify the plurality of objects which lie within the predetermined threshold distance of each other, by run time creation of soft logic cores to enable hardware threading when processing load increases and hence provide real time results; and an operating system configured to make the processing on the Software (SW) threads on processor and Hardware (HW) threads on configurable processing unit transparent to application.

In accordance with an embodiment of the present invention, the one or more data capturing devices are selected from visual cameras, ultrasonic sensors and 3D sensors such as radars, LiDARs, Laser Detection and Ranging (LaDAR), Light Emitting Diode Detection and Ranging (LeDDAR) mmWave Radar, C or K Band Radar, laser scanners and Time of Flight (ToF) sensors.

In accordance with an embodiment of the present invention, the object data is in a form of 2D or 3D point clouds or data points in 2D or 3D, representing the plurality of objects.

In accordance with an embodiment of the present invention, the processing module is configured to facilitate clustering by using Balanced Iterative Reducing and Clustering using Hierarchies (BIRCH) clustering.

In accordance with an embodiment of the present invention, the processing module is configured to process the one or more clusters using brute force by identifying & providing a list of data points which lie within the predetermined threshold distance of each other, and accordingly identifying the plurality of objects that are at risk of collision.

In accordance with an embodiment of the present invention, the plurality of objects are all kinds of living and non-living objects selected from a group comprising humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

BRIEF DESCRIPTION OF THE DRAWINGS

So that the manner in which the above recited features of the present invention can be understood in detail, a more particular to the description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, the invention may admit to other equally effective embodiments.

These and other features, benefits and advantages of the present invention will become apparent by reference to the following text figure, with like reference numbers referring to like structures across the views, wherein.

DETAILED DESCRIPTION OF THE DRAWINGS

Figure 1A:
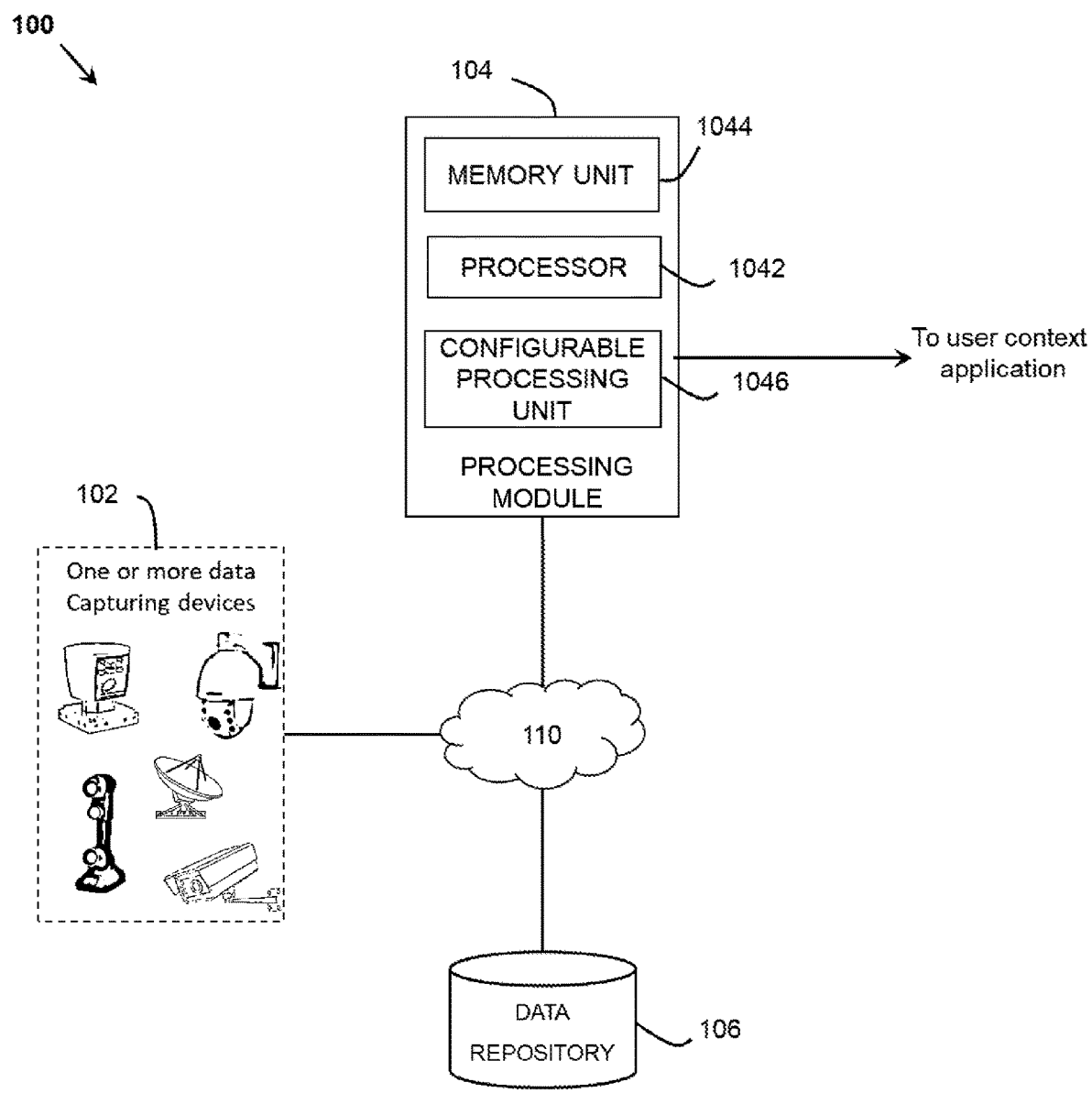
FIG. 1A illustrates a system for detecting proximity between objects, using threshold based clustering to identify any objects that are at risk of collision, in accordance with an embodiment of the present invention.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed description thereto are not intended to limit the invention to the particular form disclosed, but on the contrary, the invention is to cover all modifications, equivalents, and alternatives falling within the scope of the present invention as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more"

unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present invention. It is not suggested or represented that any or all of these matters form part of the prior art base or were common general knowledge in the field relevant to the present invention.

The present invention is described hereinafter by various embodiments with reference to the accompanying drawings, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

The present invention is described hereinafter by various embodiments. This invention may, however, be embodied in many different forms and should not be construed as limited to the embodiment set forth herein. Rather, the embodiment is provided so that this disclosure will be thorough and complete and will fully convey the scope of the invention to those skilled in the art. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope.

FIG. 1A illustrates a system (100) for detecting proximity between objects, using threshold based clustering to identify any objects that are at risk of collision, in accordance with an embodiment of the present invention. As shown in FIG. 1, the system (100) comprises of one or more data capturing devices (102) disposed in a space to be monitored and a processing module (104) connected with the one or more data capturing devices (102). The processing module (104) may further be connected with a user context application such as, but not limited to, agriculture, astronomy, atmosphere, Autonomous Vehicles, Biology and conservation, Forestry, Geology and soil science, Law enforcement, Mining, Image Recognition, Surveying, robotics, intelligent vehicle systems, augmented reality, transportation maps and geological surveys where high resolution digital elevation maps help in detecting subtle topographic features. The one or more data capturing devices (102) are selected from, but not limited to, visual cameras, ultrasonic sensors and 3D sensors such as radars, LiDARs, Laser Detection and Ranging (LaDAR), Light Emitting Diode Detection and Ranging (LeDDAR) mmWave Radar, C or K Band Radar, laser scanners and Time of Flight (ToF) sensors.

The one or more data capturing devices (102) are envisaged to capture the object data in their Field of View, inside the space (3D surrounding/environment) where the one or more data capturing devices (102) are positioned. The object data is in a form of, but not limited to, 2D or 3D point clouds or data points in 2D or 3D, representing the plurality of objects. The plurality of objects may be all kinds of living and non-living objects selected from a group comprising, but not limited to, humans of multiple age groups, animals, plants, furniture, vehicles, natural resources, eatables, crops, infrastructure, stationery, sign boards, wearables, musical instruments, sports equipment, mechanical tools, electrical equipment & electronic equipment.

Further, the processing module (104) is envisaged to include computing capabilities such as a memory unit (1042) configured to store machine readable instructions. The machine-readable instructions may be loaded into the memory unit (1042) from a non-transitory machine-readable medium, such as, but not limited to, CD-ROMs, DVD-ROMs and Flash Drives. Alternately, the machine-readable instructions may be loaded in a form of a computer software program into the memory unit (1042). The memory unit (1042) in that manner may be selected from a group comprising EPROM, EEPROM and Flash memory. The processing module (104) (104) has been shown in a detailed block diagram in FIG. 1B, in accordance with an embodiment of the present invention.

Figure 1B:
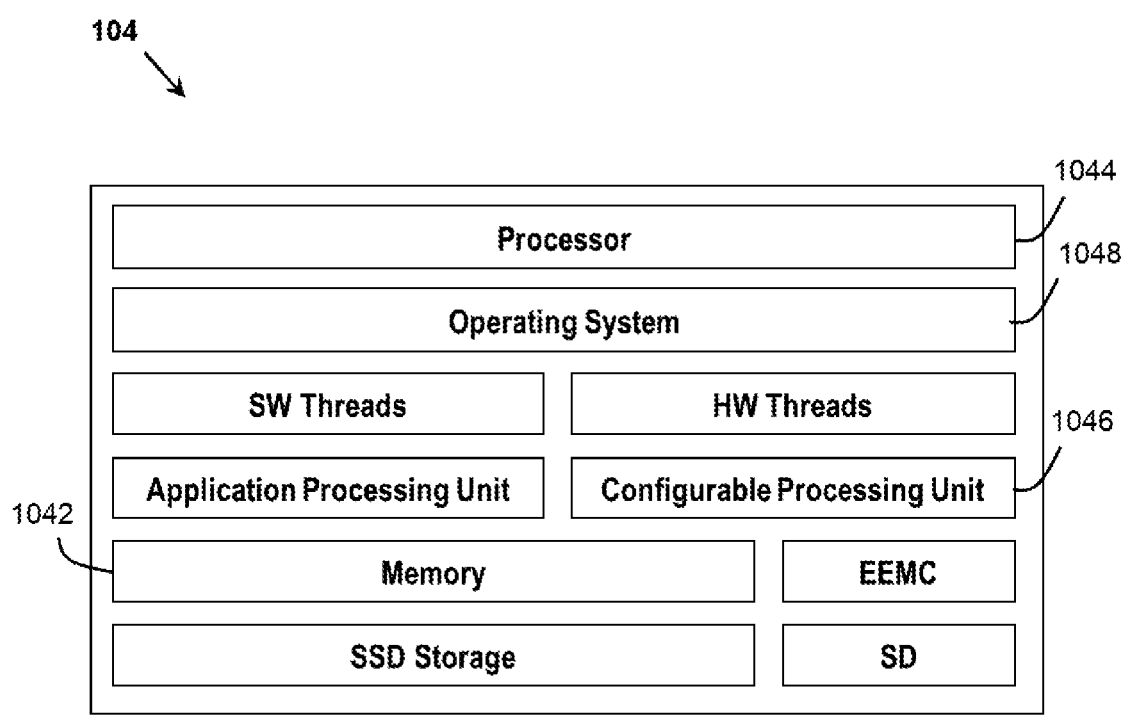
FIG. 1B illustrates a block diagram of a processing module of the system of FIG. 1A, in accordance with an embodiment of the present invention.

The processing module (104) has been shown in a detailed block diagram in FIG. 1B, in accordance with an embodiment of the present invention. As shown in FIG. 1B, the processing module (104) includes a processor (1044) operably connected with the memory unit (1042). In various embodiments, the processor (1044) may be a microprocessor selected from one of, but not limited to a ARM based or Intel based processor (1044) or in the form of field-programmable gate array (FPGA), a general-purpose processor and an application specific integrated circuit (ASIC). Additionally, the processing module (104) may further include a configurable processing unit (1046), an operating system (1048), an Application Processing Unit (APU), Hardware (HW) threads, Software (SW) threads, SSD storage, EMCC, SD etc. The configurable processing unit (1046) is operably connected with the memory unit (1042) and the processor (1044) and is configured to accelerate the clustering of the object data into one or more clusters, based on a predetermined threshold distance to reduce the search space and processing of the one or more clusters using brute force to identify the plurality of objects which lie within the predetermined threshold distance of each other, by run time creation of soft logic cores to enable hardware threading when processing load increases and hence provide real time results. Furthermore, the operating system (1048) is configured to make the processing on the SW threads on processor (1044) and HW threads on configurable processing unit (1046) transparent to user context application.

Moreover, the processing module (104) may implement artificial intelligence and deep learning-based technologies for, but not limited to, data analysis, collating data & presentation of data in real-time.

In accordance with an embodiment of the present invention, a communication network (110) may also be used in the system (100) for connecting the components within the system (100) or connecting the processing module (104) with a remote analytic system (100). The communication network (110) can be a short-range communication network and/or a long-range communication network, wire or wireless communication network. The communication interface includes, but not limited to, a serial communication interface, a parallel communication interface or a combination thereof. The communication network (110) may be implemented using a number of protocols, such as but not limited to, TCP/IP, 3GPP, 3GPP2, LTE, IEEE 802.x etc. The communication network (110) may be wireless communication network selected from one of, but not limited to, Bluetooth, radio frequency, internet or satellite communication network providing maximum coverage.

Additionally, the system (100) may include a storage module (106). The storage module (106) may be a local storage (such as SSD, eMMC, Flash, SD card, etc) or a cloud-based storage. In any manner, the storage module (106) is envisaged to be capable of providing the data to the processing module (104), when the data is queried appropriately using applicable security and other data transfer protocols. The storage module (106) may store the data and deep learning trained models of the multiple objects of all kinds of living and non-living objects selected from a group comprising, but not limited to, humans of multiple age groups (along with their physical characteristics & features), animals, plants, furniture, vehicles, natural resources, eatables, crops, infrastructure, stationery, sign boards, wearables, musical instruments, sports equipment, mechanical tools, electrical equipment, electronic equipment, and the like. In accordance with an embodiment of the present invention, the storage module (106) may be used for comparison with the detected objects for their identification and classification and/or in case, an object detected is an unseen object, then such objects may be stored for future reference.

In one aspect, the system (100) may be implemented in an embedded system (100) having the one or more data capturing devices (102), the storage module (106), and the processing module (104). In another aspect, the system (100) may be a distributed system (100) with the one or more data capturing devices (102) being externally disposed and connected with the processing module (104) & the storage module (106) in a separate computing device. A person skilled in the art would appreciate that the system (100) may be implemented in a plurality of ways.

Figure 2:
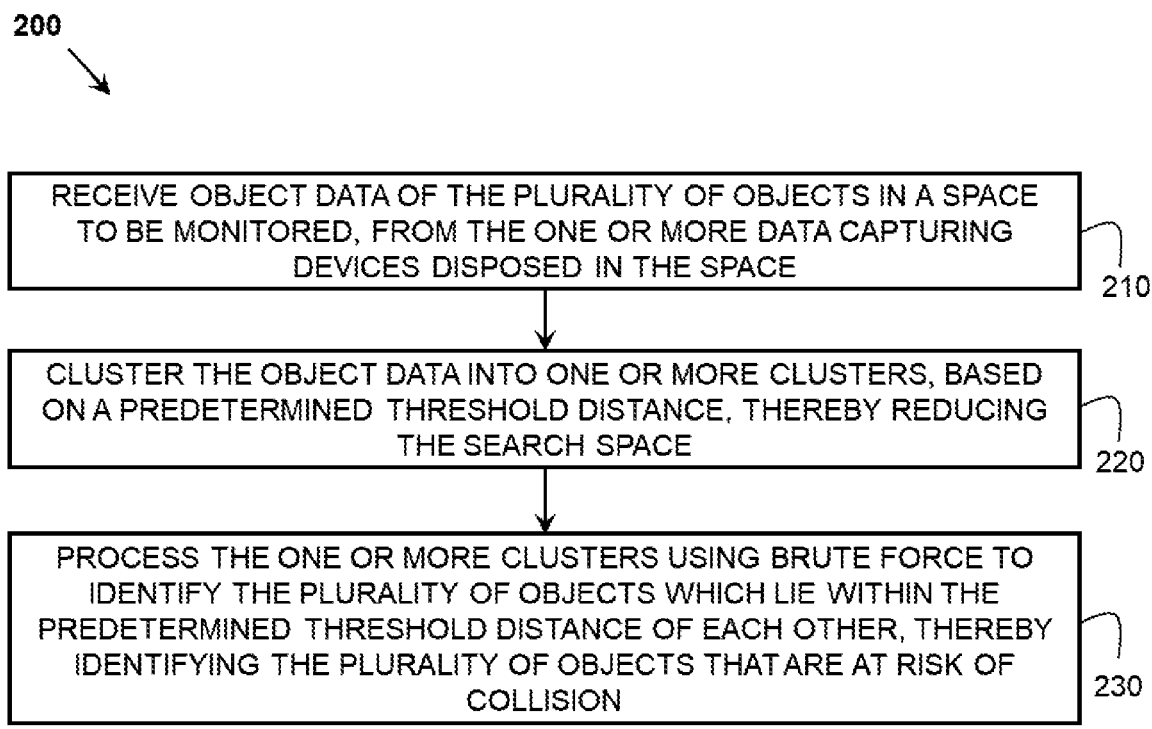
FIG. 2 illustrates a method for detecting proximity between objects, using threshold based clustering to identify any objects that are at risk of collision, in accordance with an embodiment of the present invention.

FIG. 2 illustrates a method (200) for detecting proximity between objects, using threshold based clustering to identify any objects that are at risk of collision, in accordance with an embodiment of the present invention. This method (200) would be understood more clearly with the help of an exemplary implementation and information shown in FIGS. 3A & 3B.

Figure 3A:
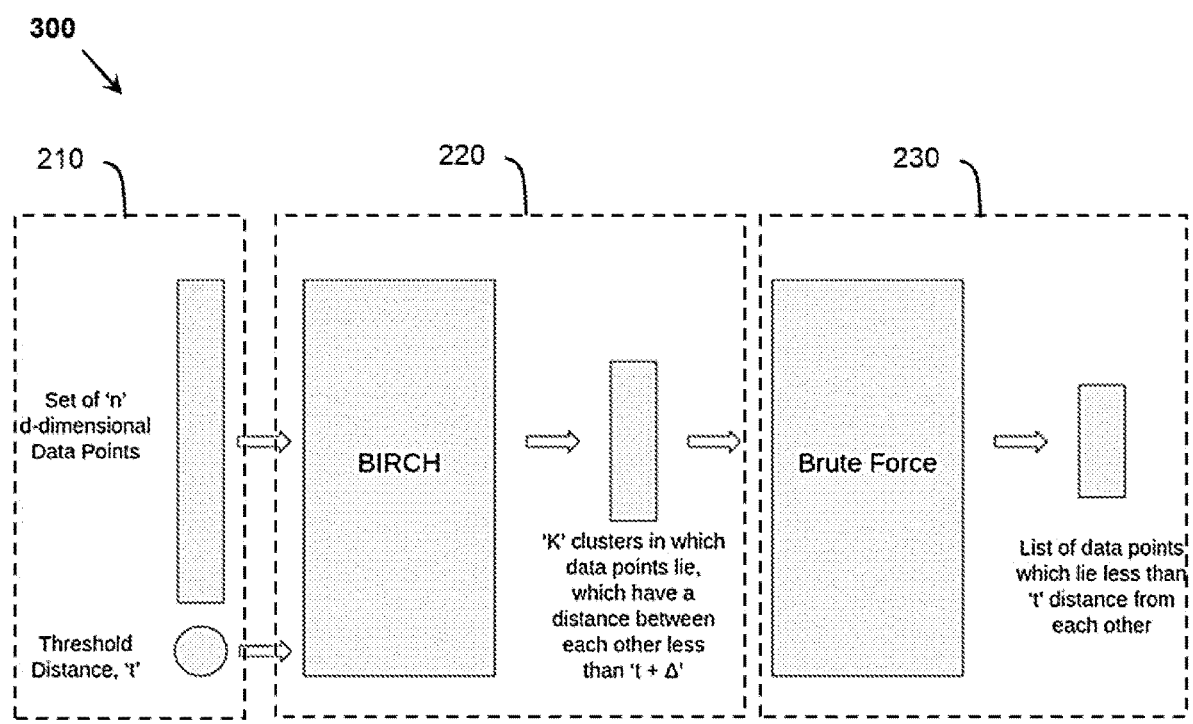
FIGS. 3A-3B illustrate information flow and an exemplary implementation of system and method shown in FIG. 1A and FIG. 2, in accordance with an embodiment of the present invention.

As shown in FIG. 2, the method (200) starts at step 210, by receiving object data of the plurality of objects in a space to be monitored, from the one or more data capturing devices (102) disposed in the space. As already mentioned, the one or more data capturing devices (102) may be, but not limited to, ultrasonic sensors, 3D sensors like radars, LiDARs, Laser Detection and Ranging (LaDAR), Light Emitting Diode Detection and Ranging (LeDDAR) mmWave Radar, C or K Band Radar laser scanners etc. and visual cameras. The object data may include 2D or 3D point clouds or data points in 2D or 3D, representing the plurality of objects. In one embodiment, the image/video/live feed from cameras is converted to data points by the processing module (104). The same has also been illustrated in FIGS. 3A & 3B. As shown in FIG. 3A, the data points may be in any of 2D or 3D. Additionally, a threshold distance may be provided to the processor (1044). Threshold distance may be the minimum distance to be maintained between two data points as per a user application.

Figure 3B:
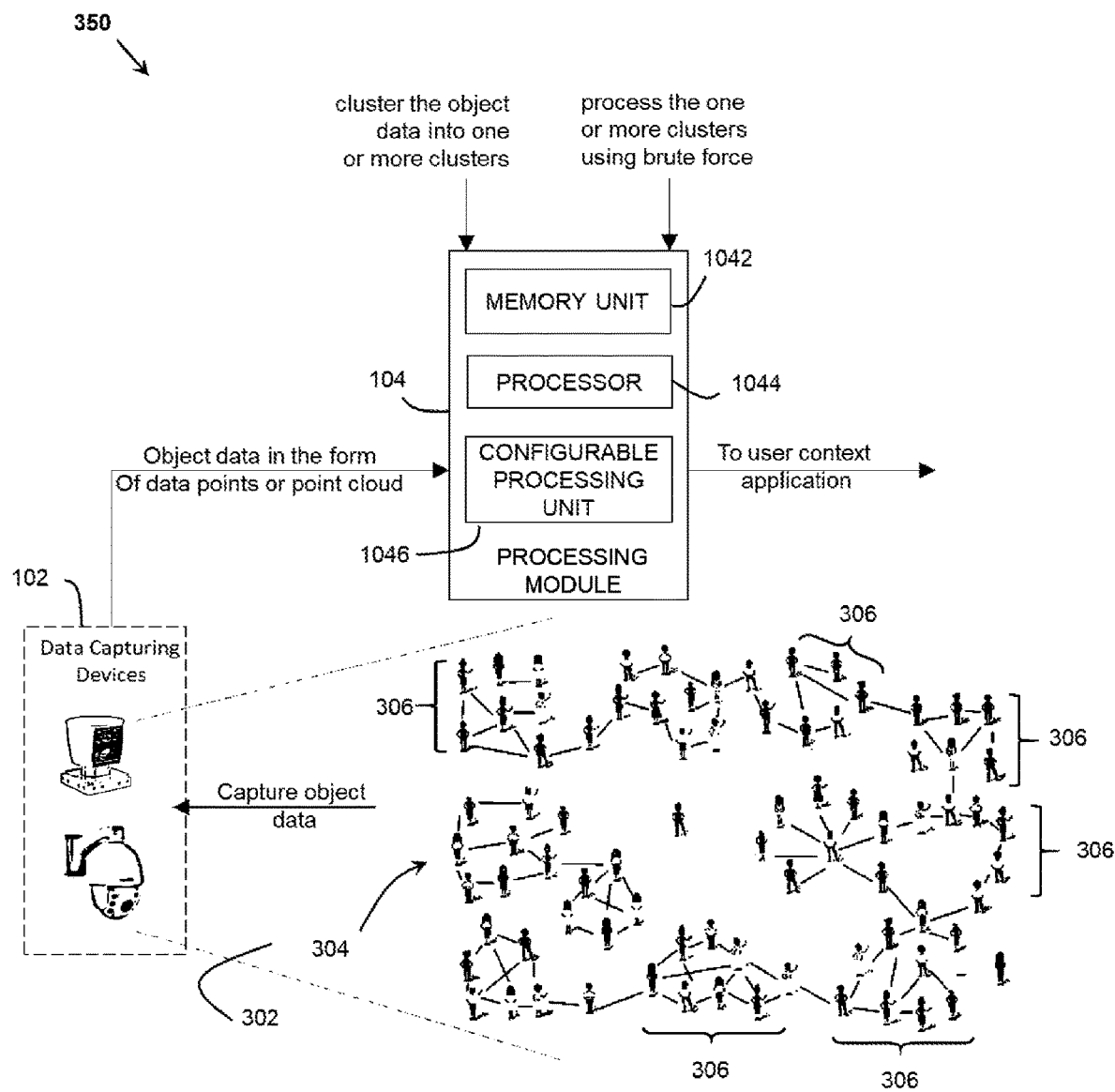

FIG. 3B shows an exemplary implementation (350) where a space (302) is to be monitored for checking whether people (304) are maintaining social distancing. Herein threshold distance "T" may be assumed to be 1 meter. So, a LIDAR or a camera (102) is seen capturing the object data in the form of 2D or 3D data points and the same is being received at the processor (1044). In one embodiment, the processor (1044) may also perform the object detection by comparing the object data with the prestored data in the storage module (106), if it is required by the context user application.

Returning to FIG. 2, at step 220, the processing module (104) is configured to cluster the object data into one or more clusters, based on a predetermined threshold distance. This reduces the search space as instead of all data points, only clusters need to be further processed now. The processor (1044) of the processing module (104) processes the object data using a Balanced Iterative Reducing and Clustering using Hierarchies (BIRCH) clustering based on a predetermined threshold distance. Most of the other clustering algorithms have the problem that the user needs to provide a number of clusters to be made, as an input. This in any case removes the advantage of clustering because the present invention aims to create as many clusters as required, to reduce the search space. Hence, BIRCH clustering is advantageous over any other clustering. It is very efficient for large (i.e. object data) as it first generates a short summary of the dataset and then clusters it instead of the actual dataset. The summary generation is done in such a way that minimum data is lost.

Referring to FIG. 3A, the BIRCH algorithm clusters data on the basis of the predetermined threshold distance "T". If a set of data points are present together within the threshold limits, they are placed in the same cluster. BIRCH uses a CF Tree data structure. Here CF is the cluster feature. Each element in the CF Tree consists of 3 parameters instead of the actual dataset. These 3 parameters are calculated with respect to the data in the Tree and not with respect to the actual points. Such a type of tree decreases the search of elements which are present in a particular cluster. Also, in the exemplary implementation of FIG. 3B, it can be seen that the people (304) have been grouped into a number of clusters (306) based on the threshold distance.

Returning to FIG. 2, at step 230, all the one or more clusters (306) obtained in previous step, are processed using the Brute force to identify the plurality of objects which lie within the predetermined threshold distance of each other. The processor (1044) identifies and provides a list of data points which lie within the predetermined threshold distance of each other, thereby identifying the plurality of objects that are at risk of collision. The same has been illustrated in FIGS. 3A & 3B. In the exemplary implementation of FIG. 3B, the processor may alert the user context application (i.e. social distancing in this case) if any of the people (302) are within 1 meter distance of other people around them. Accordingly, the list is provided to the user context application for implementing collision detection and avoidance. Although Brute Force is the most accurate algorithm, it is a computationally expensive algorithm. So, the present invention first reduces the search space using BIRCH clustering and then uses the Brute force, thereby improving the accuracy of the present invention while keeping the computational expenses to minimum. This reduces the time and processing power, thus making the decisions faster and taking it closer to real time operations.

Figure 4:
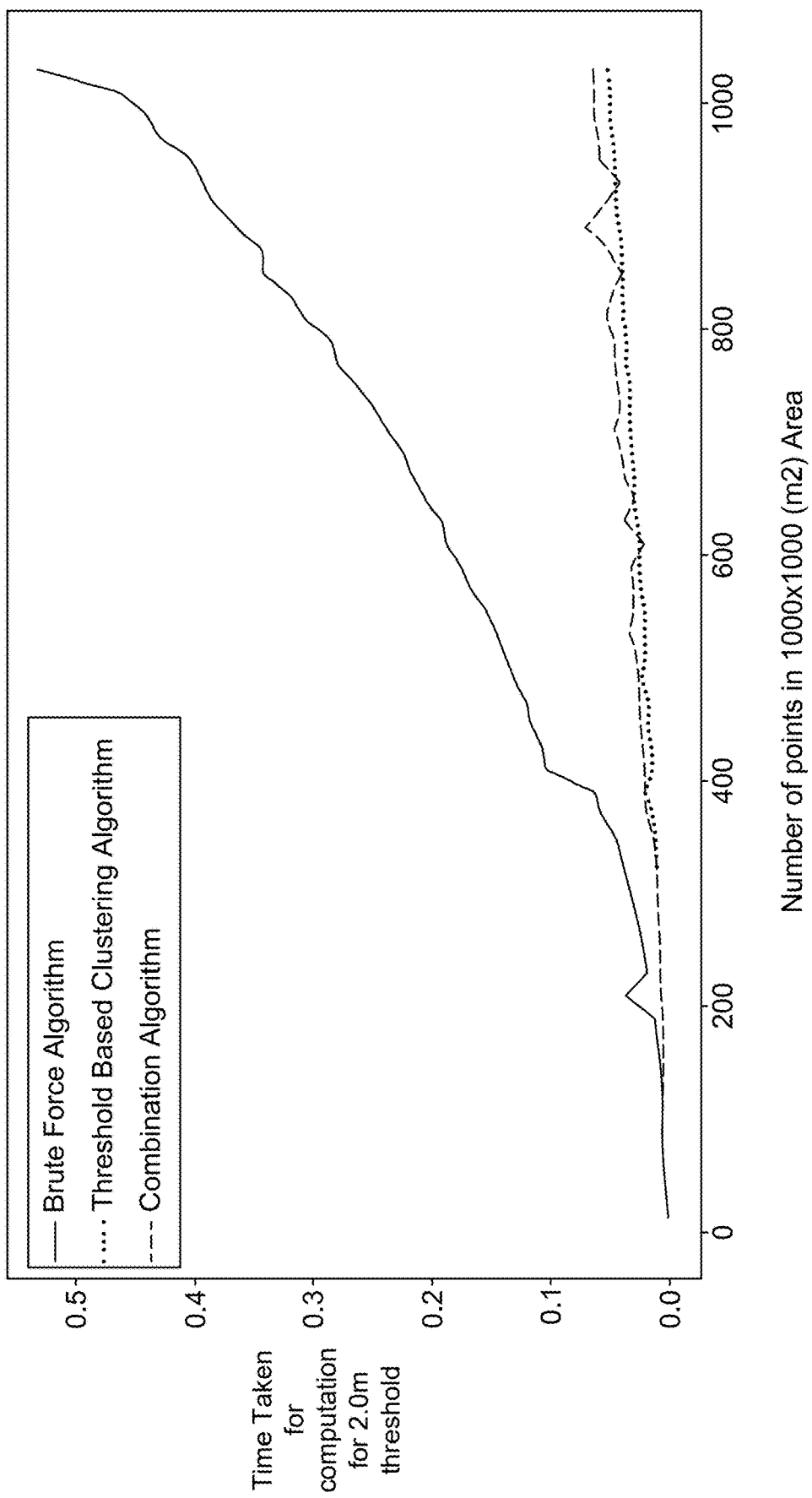
FIG. 4 illustrates a comparison of the existing solutions vs the present invention, in terms of the time consumption for processing a no. of points in 1000 $m^2$ area.

A comparison of the existing solutions vs the present invention, in terms of the time consumption for processing a no. of points in 1000 m² area is shown in FIG. 4.

As shown in FIG. 4, the x axis shows the number of random points generated for testing in a 1000 m² area, and the y axis denotes the time taken by the algorithms to compute the number of points at risk of collision for a threshold distance of 2 meters. The red line represents only the Brute Force algorithm, the blue line represents only the BIRCH algorithm and the green line represents the present invention. This invention is far more efficient in terms of space usage, time and resource consumption and cost and is also independent of the dimensions of the search space.

Apart from the above-mentioned use case, the present invention may easily be implemented for other user context applications as well. For example, let us say on a highway a lot of radars are installed and they are continuously tracking all the cars on the highway. An alarm can be generated when 2 or more cars come very near to each other.

According to an example embodiment, Freeways and highways have higher speed limits and are prone to accidents. Such accidents can be avoided if an alarm can be raised to the cars which are coming too near to each other on the highways and freeways. Many highways and freeways can be installed with an array of 3D sensors at its length in accident prone zones to continuously search detect classify track and segment cars. Further to that the proximity detection system can be used to provide real time details of the cars or vehicles coming near to each other beyond a threshold distance. When any of the vehicles come near to each other beyond a particular threshold, the drivers of those cars could be notified of a possible accident and the mishap can be avoided.

According to another example embodiment, robotics has received massive technological innovations in the past decade in order to automate mundane and monotonous human work with more precision and accuracy. Many of these robotic applications involve a swarm of robots operating in tandem and hence there is a need to continuously monitor such robots in action to avoid the ricks of them coming too near to each other and damaging property. One classic use case could be that of warehouse automation where the warehouse might have a number of robots moving around to automate pick place and sorting of racks. In such a case while the robots are running around the warehouse, they are into the risk of coming too close in the proximity of each other or to humans operating in the warehouse. The proposed system can continuously search detect classify segment track and monitor all the robots and humans in the warehouse with 3D sensors installed in the warehouse. It can provide an output to the robot navigation application when any of the robots comes too close to any other robots or humans operating in the warehouse beyond a particular threshold to avoid any damage to the warehouse. Such a system can also be extended where any kind of robots are working in a swarm to facilitate any kind of automation and are at the risk of coming too close to each other.

The purpose of the present invention is primarily is to, but not limited to, provide the user application, the following data from the system:
  Data for searching and detection of humans in 3D sensor point cloud and then to track the humans.
  Social Distancing requires this data to be provided along with indication of people coming near each other beyond a particular threshold to the user application
  This requires the system to search, detect and track humans and identify if any tracks in a large search space are closer than a defined unit of distance (predetermined threshold distance).
  The present application is also capable of searching, detecting and tracking human or any other object and identify if any tracks in a large search space are farther than a defined unit of distance (predetermined threshold distance), if any user context application requires it.
  This is done in real time with very low computation as well as memory and response time.
  Since the amount of area covered by multiple data capturing devices, is huge and the number of humans in an area can also be unpredictably huge, therefore, the present invention provides a light solution in terms of time complexity and computational complexity.

[SA] We need to add the time complexity as given Raghav and Alankrit during the Provisional Application Draft.

The time complexity of the Brute Force algorithm is $O((n-1)!)$, where n is the number of points on which the algorithm is used. The complexity of the BIRCH clustering algorithm is $O(n)$, where n is the total number points. The Brute Force algorithm runs only on the output of the BIRCH algorithm, hence the total complexity would be $O(n)+O((m-1)!)$, where n is the total number of points and m is the number of points detected by the BIRCH algorithm. In the worst case, where such a situation arises that BIRCH detects all points in the dataset in the first step, Brute force will be implemented for all points. Hence, the worst-case time complexity of the algorithm would come out to be $O((n-1)!)$. Hence the time complexity of the algorithm is:
  Worst Case: $O((n-1)!)$
  Median Case: $O((\log(n))!)$
  Best Case: $O(n)$ The present invention offers a number of advantages. Firstly, it provides a cost-effective and technologically advanced solution to the problems of the prior art, the solution provided herein is easy to understand and implement. Then, the present invention provides a system and method that uses a minimum amount of storage and processing time to give accurate results, thus making the decisions faster and taking it closer to real time operations. Further, the present invention is efficient in terms of time consumption, resource consumption and cost. Additionally, the solution of the present invention is independent of the dimensions of the search space and can be used for both 2D, 3D, 4D or any $N^{th}$ dimensional space. Moreover, it can used by solution providers wanting to detect objects in 3d space near to each other beyond a particular threshold in real time with less computation or by Data Scientists, big Data Scientists & 3D Point Cloud Processing Companies working on similar implementations. Also, it can be easily be utilized for, but not limited to, Collision Detection Algorithms in Robotics, Obstacle Avoidance Algorithms and Implementing Social Distancing through cameras or 2D/3D Laser Scanners or LiDARs.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Further, while one or more operations have been described as being performed by or otherwise related to certain modules, devices or entities, the operations may be performed by or otherwise related to any module, device or entity. As such, any function or operation that has been described as being performed by a module could alternatively be performed by a different server, by the cloud computing platform, or a combination thereof. It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publicly accessible network such as the Internet.

It should also be understood that, unless specifically stated otherwise as apparent from the following discussion, it is appreciated that throughout the description, discussions utilizing terms such as "controlling" or "obtaining" or "computing" or "storing" or "receiving" or "determining" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and the appended claims.

We claim:

1. A method (200) for detecting proximity between objects using threshold-based clustering, the method (200) comprising:
   receiving (210) object data of a plurality of objects in a space to be monitored, from one or more data capturing devices (102) disposed in a space, wherein the one or more data capturing devices include 3D sensors such as radars, LiDARs, Laser Detection and Ranging (LaDAR), Light Emitting Diode Detection and Ranging (LeDDAR) mmWave Radar, C or K Band Radar, laser scanners and Time of Flight (ToF) sensors;
   clustering (220) the object data using Balanced Iterative Reducing and Clustering using Hierarchies (BIRCH) clustering into one or more clusters, based on a predetermined spatial threshold distance, thereby reducing the search space, wherein the object data is represented as 2D, 3D, or N-dimensional point clouds;
   processing (230) the one or more clusters by performing brute force computation on the reduced search space to identify the plurality of objects which lie within the predetermined threshold distance of each other, thereby identifying the plurality of objects that are at risk of collision; and
   providing real-time results of identified objects at risk of collision.

2. The method (200) as claimed in claim 1, wherein the step of clustering is to reduce computational complexity and processing is independent of the dimensionality of the monitored space, allowing for detection in 2D, 3D, or higher-dimensional object data.

3. The method (200) as claimed in claim 1, wherein the step of processing the one or more clusters using brute force computation comprises identifying & providing a list of data points which lie within the predetermined threshold distance of each other, and accordingly identifying the plurality of objects that are at risk of collision.

4. The method (200) as claimed in claim 1, wherein the plurality of objects are all kinds of living and non-living objects selected from a group comprising humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

5. A system (100) for detecting proximity between objects using threshold-based clustering, the system (100) comprising:
   one or more data capturing devices (102) disposed in a space to be monitored, wherein the one or more data capturing devices include 3D sensors such as radars, LiDARs, Laser Detection and Ranging (LaDAR), Light Emitting Diode Detection and Ranging (LeDDAR) mmWave Radar, C or K Band Radar, laser scanners and Time of Flight (ToF) sensors; and
   a processing module (104) connected with the one or more data capturing devices (102), the processing module (104) comprising:
      a memory unit (1042) configured to store machine-readable instructions; and
      a processor (1044) operably connected with the memory unit (1042), the processor (1044) obtaining the machine-readable instructions from the memory unit (1042), and being configured by the machine-readable instructions to:
         receive object data represented as 2D, 3D, or N-dimensional point clouds of a plurality of objects from the one or more data capturing devices (102) disposed in the space;
         cluster the object data using Balanced Iterative Reducing and Clustering using Hierarchies (BIRCH) clustering, into one or more clusters, based on a predetermined threshold distance to reduce the search space; and
         process the one or more clusters by performing brute force computation on the reduced search space to identify the plurality of objects which lie within the predetermined threshold distance of each other, thereby identifying the plurality of objects that are at risk of collision;
      a configurable processing unit configured to accelerate clustering and brute force processing through runtime creation of soft logic cores, enabling hardware threading for dynamic load handling and real-time output.

6. The system (100) as claimed in claim 5, wherein the processing module (104) is configured to run
   an operating system (1048) which is further configured to make the processing on the Software (SW) threads on processor (1044) and Hardware (HW) threads on configurable processing unit (1046) transparent to application.

7. The system (100) as claimed in claim 5, wherein the processing module (104) is configured to facilitate clustering by using Balanced Iterative Reducing and Clustering using Hierarchies (BIRCH) clustering to reduce computational complexity by grouping object data into clusters based on a predetermined spatial threshold distance, and processing is independent of the dimensionality of the monitored space, allowing for detection in 2D, 3D, or higher-dimensional object data.

8. The system (100) as claimed in claim 5, wherein the processing module (104) is configured to process the one or more clusters using brute force by identifying & providing a list of data points which lie within the predetermined threshold distance of each other, and accordingly identifying the plurality of objects that are at risk of collision.

9. The system (100) as claimed in claim 5, wherein the plurality of objects are all kinds of living and non-living objects selected from a group comprising humans of multiple age groups, animals, plants, furniture, vehicles, natural resources, eatables, crops, infrastructure, stationery, sign boards, wearables, musical instruments, sports equipment, mechanical tools, electrical equipment and electronic equipment.

* * * * *